United States Patent [19]

Ma

[11] Patent Number: 5,865,431
[45] Date of Patent: Feb. 2, 1999

[54] SCANNER HAVING SHEET FEED AND SELF MOVE MODES

[76] Inventor: His-Kuang Ma, 4F, No. 48, Sec.2, Chung Cherng Road, Taipei, Taiwan

[21] Appl. No.: 874,145

[22] Filed: Jun. 13, 1997

[51] Int. Cl.[6] .................................................... B65H 5/00
[52] U.S. Cl. ......................... 271/3.14; 358/473; 358/474; 358/496; 358/497
[58] Field of Search .................................. 271/3.14, 3.18, 271/3.21; 358/498, 473, 474, 496, 497

[56] References Cited

U.S. PATENT DOCUMENTS

| | | | |
|---|---|---|---|
| 4,831,459 | 5/1989 | Kimura | 358/473 |
| 5,739,923 | 4/1998 | Kawahara | 358/474 |

FOREIGN PATENT DOCUMENTS

| | | | |
|---|---|---|---|
| 60-0256264 | 12/1985 | Japan | 358/474 |

*Primary Examiner*—H. Grant Skaggs
*Attorney, Agent, or Firm*—Bacon & Thomas, PLLC

[57] ABSTRACT

A scanner which can be used in both sheet feed and self move modes including a scanner body and a cover. The scanner body has an entry slot at a top side of a lateral wall thereof, and an elongated roller driven by a motor and connected via circuit means to a control panel. The control panel is connected via circuit means to a sensor at one end and is connected to a connector at the other end for connection with a computer. The scanner body further has an exit slot at a top side of a lateral wall opposite to the entry slot. The cover is a plate connected via connecting means to the top side of the scanner body and can be turned open through 270°. When the cover is put on the scanner body, the scanner is in a sheet feed mode. But when the cover is turned over through 270° and the scanner body inverted, the scanner is in a self move mode.

6 Claims, 3 Drawing Sheets

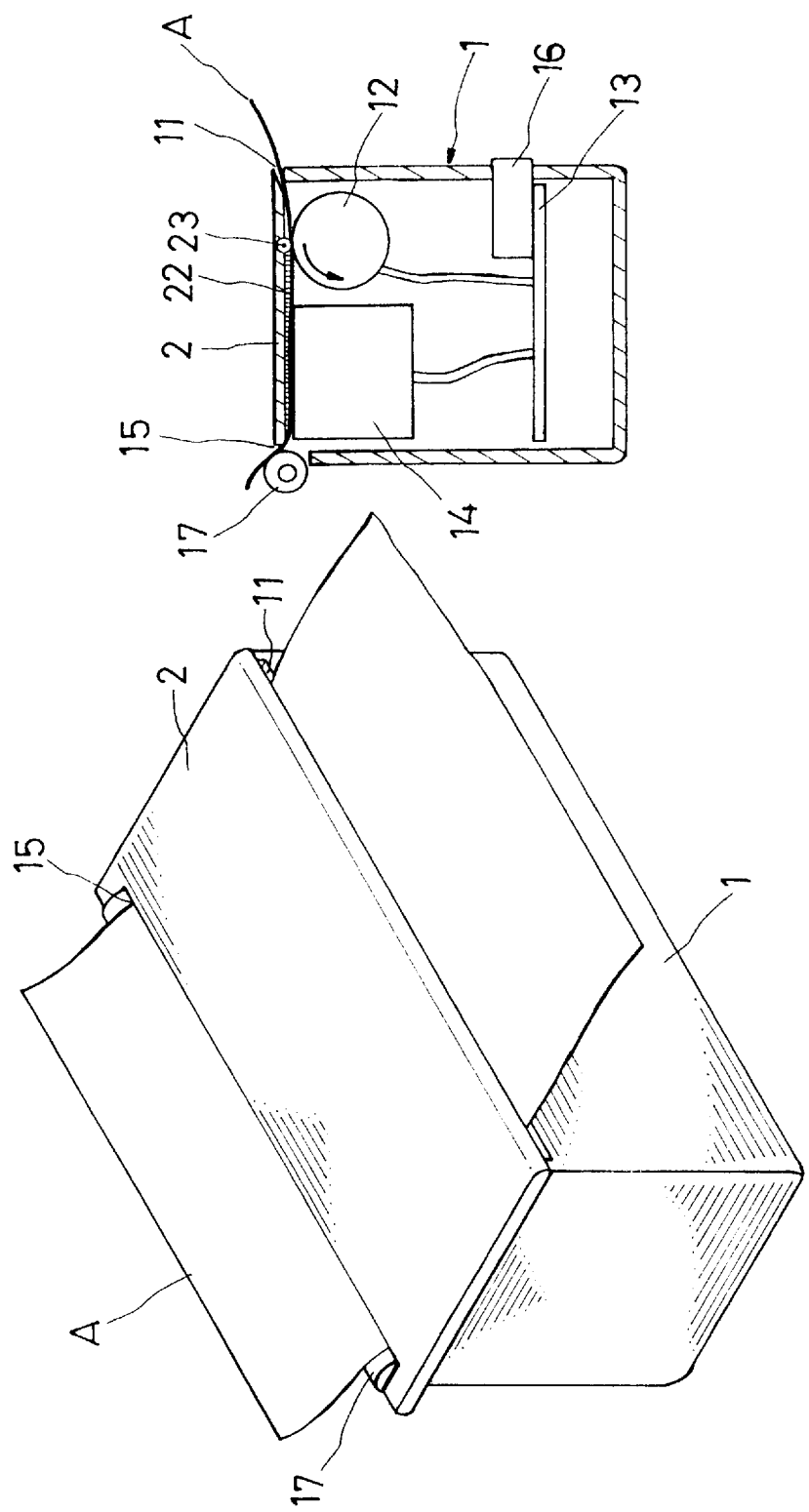

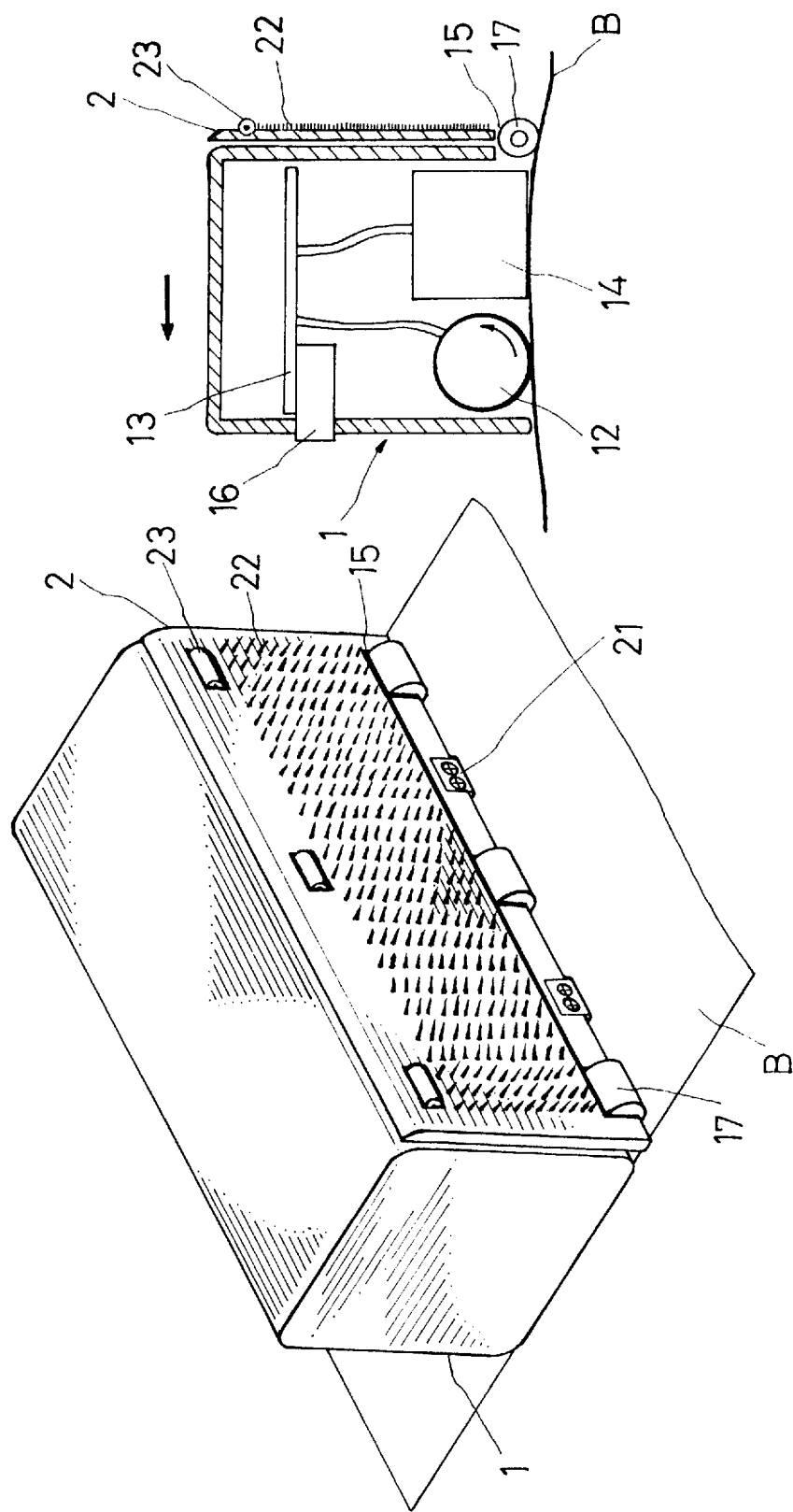

SCANNER HAVING SHEET FEED AND SELF MOVE MODES

BACKGROUND OF THE INVENTION (a) Field of the Invention

The present invention relates generally to a scanner, and more particularly to a sheet feed and self move type scanner.

(b) Description of the Prior Art

The scanner is a kind of computer key-in tool. For illustrated printer materials in particular, the contents may be input into the memories of the computer using a scanner, eliminating the trouble of duplicating, keying-in, drawing, etc. The contents may also be corrected, arranged and printed with use of the computer. Thus, scanners play an important role in the use of information products.

Existing portable scanners generally fall into two main types: sheet feed type and self move type. The so-called sheet feed type scanner is similar to the facsimile machine, in which the document to be scanned is placed at an entry slot and is rolled past a sensor which senses the contents of the document and transmit the same to a signal processor for conversion into signals to be stored in the computer. As for the so-called self move type scanner, the document to be scanned is placed flat on a planar plate, and a movable sensor passes over the document, scanning the contents at the same time. The contents are also converted into signals to be stored in the computer. This type is suitable for scanning relatively thick books or a pile of documents that cannot be dismantled. Certainly, it is also suited for large-size documents that need to be scanned partly and several times.

SUMMARY OF THE INVENTION

Accordingly, a primary object of the present invention is to provide a scanner which may, with the arrangement of an openable cover that may turn through 270°, be used in both sheet feed mode and self move mode to match any kinds of document.

BRIEF DESCRIPTION OF THE DRAWINGS

The foregoing and other features and advantages of the present invention will be more clearly understood from the following detailed description and the accompanying drawings, in which.

FIG. 2 is a schematic sectional view of the present invention when in a sheet feed mode;

FIG. 3 is a schematic elevational view of the present invention when in the sheet feed mode;

FIG. 4 is a schematic sectional view of the present invention when in a self move mode; and FIG. 5 is a schematic elevational view of the present invention when in the self move mode.

DETAILED DESCRIPTION OF THE PREFERRED EMBODIMENTS

Figure 1:
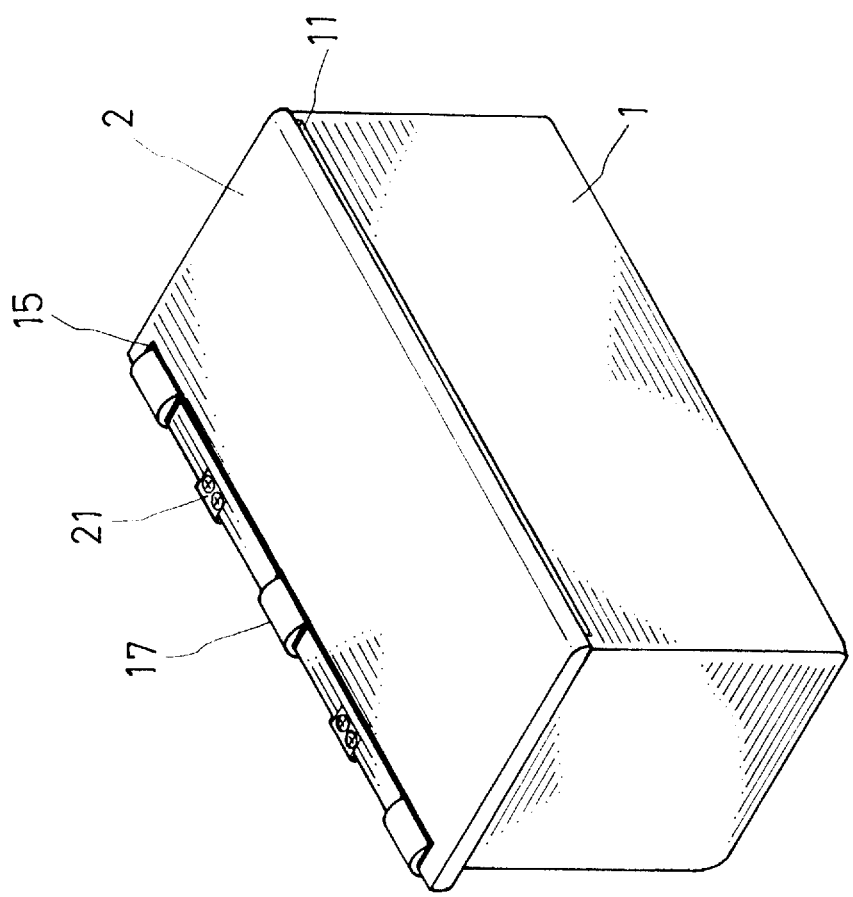
FIG. 1 is a schematic elevational view of the present invention.

As shown in the drawings, the present invention essentially comprises a scanner body 1 and a cover 2 capable of rotary opening or closing relative to the scanner body 1.

Referring to FIG. 2, the scanner body 1 has an entry slot 11 formed at a top side of a lateral wall thereof, an elongated roller 12 being disposed at a top end of an interior thereof, and a control panel 13 connected to a circuit of a drive motor. The control panel 13 is also connected via circuit to a sensor 14 which has an exit slot 15 formed at a lateral side thereof for exit of scanned documents. In addition, the control panel 13 is coupled to a connector 16 for connection with a computer and input of scan signals. At the same time, at a top of a lateral side of the exit slot 15 is provided a plurality of slide rollers 17 capable of smooth rotation for reducing friction when the scanner of the invention is used in a self type mode.

The cover 2 is a plate structure sized to match the scanner body 1. After the cover 2 has been put in place, it defines a clearance with the elongated roller 12 and the sensor 14 in the scanner body 1 for passage of the document to be scanned. At the same time, the cover 2 is connected to the top side of the scanner body 1 near the sensor 14 by means of connecting means 21 such as hinges so that it may be lifted and turned through 270°. In addition, bristles 22 may be provided at an inner wall of the cover 2 to ensure that the scanned document is in tight contact with the elongated roller 12 and the sensor 14 so as to enhance the scanning effect. A plurality of driven rollers 23 corresponding to the elongated roller 12 are provided so that they may cooperate with the elongated roller 12 to clamp the scanned document.

With reference to the drawings, when the scanner of the present invention is used in a sheet feed mode, and when a document A is inserted into the entry slot 11, the elongated roller 12 is driven by the motor to rotate so that the document A is rolled in between the elongated roller 12 and the driven rollers 23 and passed over the sensor 14. The sensor 14 senses the image on the document A and transmit the same to the control panel 13 for signal processing, and the signal is transmitted via the connector 16 to the computer memory. Subsequently, the document A is transported out of the scanner via the exit slot 15, and the scanning operation is completed.

Referring to FIGS. 4 and 5, when the present invention is used in the self move mode, the cover 2 is turned open through 270°, and the scanner body 1 is inverted, so that the elongated roller 12 and the sensor 14 are located at the bottom of the scanner. The scanner is then placed on a document B to be scanned. Since the elongated roller 12 is capable of rolling motion, it can bring the entire scanner to advance forwardly, so that the sensor 14 may sense the image on the document B while moving forwardly, and the information is transmitted to the control panel 13 for signal processing. The processed signal is then transmitted by the connector 16 to the computer memory for storage. Since the slide rollers 17 may rotate smoothly, the entire scanner may move smoothly forward with minimal friction.

In view of the foregoing, the scanner according to the present invention may, with the arrangement of the openable cover 2 that may turn through 270°, be used in both sheet feed mode and self move mode to match any kinds of document.

Although the present invention has been illustrated and described with reference to the preferred embodiment thereof, it should be understood that it is in no way limited to the details of such embodiment but is capable of numerous modifications within the scope of the appended claims.

What is claimed is:

1. A scanner having sheet feed and self move modes, said scanner comprising:

a scanner body, having an entry slot at a top side of a lateral wall thereof; an elongated roller driven by a motor and disposed in an interior thereof, said elongated roller being connected via circuit to a control panel, said control panel being in turn connected via circuit to a sensor at one end and a connector at the other end for connection with a computer, said scanner body further having an exit slot at a top side of a lateral wall opposite to said entry slot; and a cover, said cover being a plate structure connected to a top side of said scanner body by connecting means and being capable of being turned through 270°;

whereby when said cover is put in place on said scanner body, said scanner is in a sheet feed mode, but when said cover is turned open through 270° and said scanner body is inverted, said scanner is in a self move mode.

2. A scanner having sheet feed and self move modes as claimed in claim 1, wherein a plurality of slide rollers capable of smooth rotation are disposed at a top wall of said scanner body near said exit slot.

3. A scanner having sheet feed and self move modes as claimed in claim 1, wherein said cover is provided with bristles at an inner wall thereof.

4. A scanner having sheet feed and self move modes as claimed in claim 1, wherein a plurality of driven rollers are disposed on said cover for reverse rotation relative to said elongated roller.

5. A scanner having sheet feed and self move modes as claimed in claim 1, wherein said connecting means are hinges.

6. A scanner having sheet feed and self move modes as claimed in claim 1, wherein said slide rollers are internally provided with lubricating bearings.

* * * * *